United States Patent
Gopalkrishna et al.

(10) Patent No.: US 11,645,770 B2
(45) Date of Patent: *May 9, 2023

(54) SYSTEM AND METHOD FOR QUANTIFYING NOZZLE OCCLUSION IN 3D PRINTING

(71) Applicant: Palo Alto Research Center Incorporated, Palo Alto, CA (US)

(72) Inventors: Vijay Kumar Baikampady Gopalkrishna, San Jose, CA (US); Raja Bala, Pittsford, NY (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/529,012

(22) Filed: Nov. 17, 2021

(65) Prior Publication Data

US 2022/0076434 A1    Mar. 10, 2022

Related U.S. Application Data

(63) Continuation of application No. 16/740,139, filed on Jan. 10, 2020, now Pat. No. 11,227,400.

(51) Int. Cl.
| | |
|---|---|
| *G06T 7/44* | (2017.01) |
| *G06T 7/00* | (2017.01) |
| *G06N 20/00* | (2019.01) |
| *B29C 64/393* | (2017.01) |
| *B29C 64/35* | (2017.01) |

(Continued)

(52) U.S. Cl.
CPC .............. *G06T 7/44* (2017.01); *B29C 64/209* (2017.08); *B29C 64/35* (2017.08); *B29C 64/393* (2017.08); *G06N 20/00* (2019.01); *G06T 7/0008* (2013.01); *G06T 7/136* (2017.01)

(58) Field of Classification Search
CPC ......... G06T 7/44; G06T 7/0008; G06T 7/136; B29C 64/209; B29C 64/35; B29C 64/393; B29C 64/386; G06N 20/00; G06N 3/0454; G06N 3/08; B33Y 50/00
See application file for complete search history.

(56) References Cited

U.S. PATENT DOCUMENTS

| | | | |
|---|---|---|---|
| 2015/0165683 A1* | 6/2015 | Cheverton | B29C 64/112 382/141 |
| 2017/0057170 A1* | 3/2017 | Gupta | G05B 19/4099 |

FOREIGN PATENT DOCUMENTS

| | | |
|---|---|---|
| CN | 103448387 A | * 12/2013 |
| CN | 107972270 A | * 5/2018 |

(Continued)

*Primary Examiner* — Charles T Shedrick
(74) *Attorney, Agent, or Firm* — Shun Yao; Yao Legal Services, Inc.

(57) ABSTRACT

One embodiment can provide a system for detecting occlusion at an orifice of a three-dimensional (3D) printer nozzle while the printer nozzle is jetting liquid droplets. During operation, the system uses one or more cameras to capture an image of the orifice of the printer nozzle while the 3D printer nozzle is jetting liquid droplets. The system performs an image-analysis operation on the captured image to identify occluded regions within the orifice of the 3D printer nozzle, compute an occlusion fraction based on the determined occluded regions, and generate an output based on the computed occlusion fraction, thereby facilitating effective maintenance of the 3D printer.

20 Claims, 7 Drawing Sheets

(51) Int. Cl.
 *B29C 64/209* (2017.01)
 *G06T 7/136* (2017.01)

(56) References Cited

FOREIGN PATENT DOCUMENTS

| | | | | | |
|---|---|---|---|---|---|
| CN | 108407305 | A | * | 8/2018 | |
| CN | 109318486 | A | * | 2/2019 | |
| CN | 209224561 | U | * | 8/2019 | |
| CN | 211982028 | U | * | 11/2020 | |
| JP | 2020059266 | A | * | 4/2020 | ............. B05B 15/50 |

* cited by examiner

SYSTEM AND METHOD FOR QUANTIFYING NOZZLE OCCLUSION IN 3D PRINTING

RELATED APPLICATION

This application is a continuation of U.S. application Ser. No. 16/740,139, entitled "SYSTEM AND METHOD FOR QUANTIFYING NOZZLE OCCLUSION IN 3D PRINTING," by inventors Vijay Kumar Baikampady Gopalkrishna and Raja Bala, filed 10 Jan. 2020.

BACKGROUND

Field

This disclosure is generally related to 3D printing. More specifically, this disclosure is related to a system and method that monitors and quantifies the blockage condition of the printer nozzle.

Related Art 3D printing, sometimes referred to as additive manufacturing, involves manufacturing a part by depositing material layer by layer. There are various types of 3D printing process, such as material extrusion, binder jetting, material jetting, direction energy deposition, powder bed fusion, sheet lamination, vat photopolymerization, etc.

Although plastic is the most common material used in 3D printing, recent developments in 3D printing technologies include 3D printing of metal. More specifically, a liquid metal jet printing (LMJP) device can lay down tiny droplets of liquid metal, such as molten aluminum, to create metal objects gradually, layer by layer. An LMJP device can be constructed in a way somewhat similar to a consumer ink jet printer but instead of ink, the printer nozzle shoots out droplets of liquid metal. Unlike ink, the liquid metal droplets may oxidize as they leave the nozzle and are exposed to air, and the oxidized metal can result in occlusion at the printer nozzle orifice.

SUMMARY

One embodiment can provide a system for detecting occlusion at an orifice of a three-dimensional (3D) printer nozzle while the printer nozzle is jetting liquid droplets. During operation, the system uses one or more cameras to capture an image of the orifice of the 3D printer nozzle while the 3D printer nozzle is jetting liquid droplets. The system performs an image-analysis operation on the captured image to identify occluded regions within the orifice of the 3D printer nozzle, compute an occlusion fraction based on the determined occluded regions, and generate an output based on the computed occlusion fraction, thereby facilitating effective maintenance of the 3D printer.

In a variation on this embodiment, performing the image-analysis operation can include computing a gray-level co-occurrence matrix (GLCM) for the captured image to obtain a texture-analysis outcome associated with the captured image.

In a further variation, computing the GLCM can further include applying a 4×2 offset matrix on pixels of the captured image In a further variation, the 4×2 offset matrix can include matrix [0,1; −1,1; −1,0; −1,−1].

In a further variation, the system can apply an adaptive thresholding technique on the texture-analysis outcome to obtain a binary pixel map of the captured image.

In a variation on this embodiment, performing the image-analysis operation can include training a machine-learning model using labeled images of the orifice of the 3D printer nozzle, and applying the trained machine-learning model on the captured image to identify the occluded regions.

In a variation on this embodiment, performing the image-analysis operation can include training a machine-learning model using a sequence of labeled images of the orifice of the 3D printer nozzle captured over a predetermined time interval, and applying the trained machine-learning model on a sequence of images of the orifice of the 3D printer nozzle to identify the occluded regions.

BRIEF DESCRIPTION OF THE FIGURES

In the figures, like reference numerals refer to the same figure elements.

DETAILED DESCRIPTION

Figure 1:
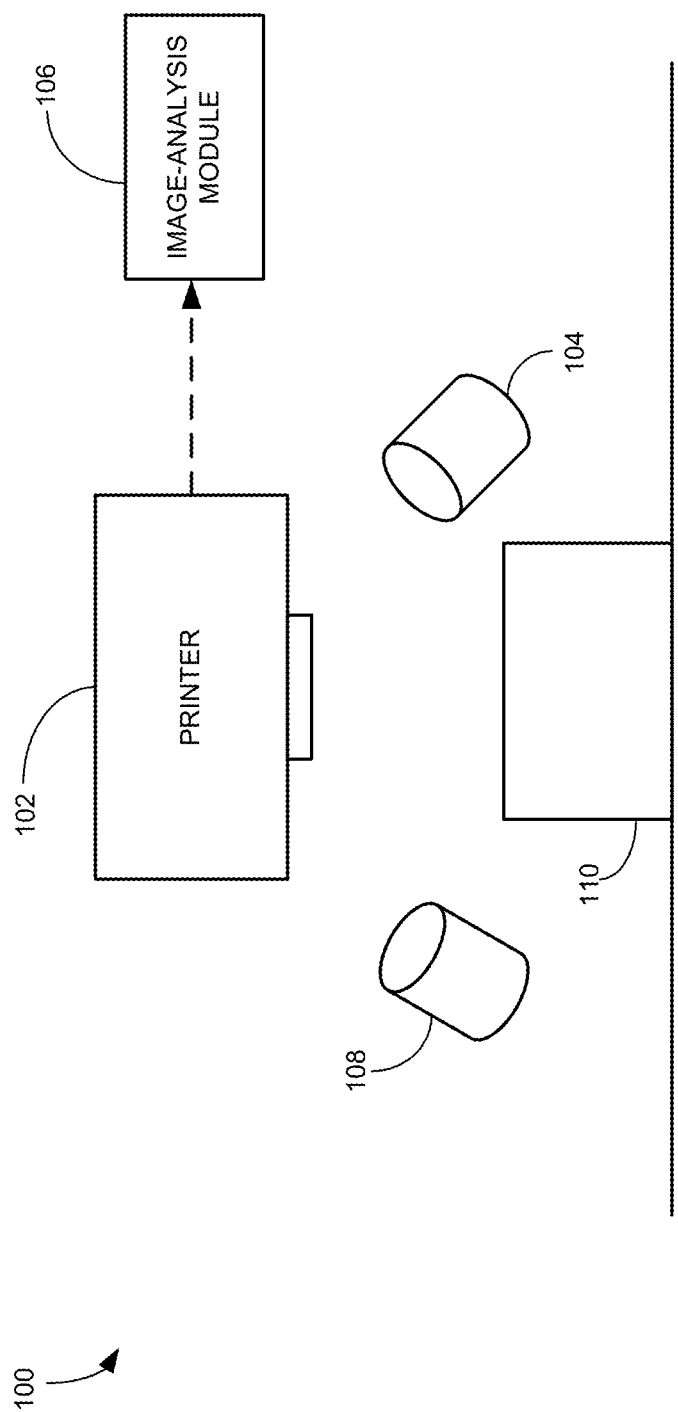
FIG. 1 presents an exemplary printer system, according to one embodiment.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

The embodiments described herein solve the technical problem of monitoring and quantifying the occlusion at the printer nozzle of a 3D printer while the 3D printer is printing. More specifically, during printing, a camera can capture images (e.g., still images or videos) of the nozzle, more specifically the orifice of the nozzle. The captured images can be analyzed, in real time, to distinguish occluded areas (which can have a rough texture) from non-occluded areas (which can have a smooth texture) within the orifice of the nozzle. To distinguish an occluded area from a non-occluded area, the system computes, for example, a gray-level co-occurrence matrix (GLCM) on the image to measure local texture. The GLCM map can then be thresholded and binarized to produce an image containing a binary map of the occluded and non-occluded regions. Alternatively, the system can recognize the occluded area from the captured images using a machine-learning technique. The system can further compute an occlusion fraction. In further embodiments, the system may determine whether the occlusion fraction exceeds a predetermined threshold; if so, the printer can be brought offline for service.

Printer Nozzle Monitoring System

As discussed previously, when performing 3D printing of liquid metal (LM), the oxidization of the metal may cause blockage at the nozzle of the 3D printer. A partially blocked nozzle can reduce the efficiency of the 3D printer. Moreover, the partially blocked printer nozzle can also prevent the LM droplets from being deposited accurately according to the design, thus leading to the quality and/or integrity of the printed part being compromised. In current 3D printing systems, to mitigate the negative effects of the nozzle blockage, frequent manual inspections are needed where a human operator visually inspects the blockage at the printer nozzle, and if the printer nozzle is severely blocked (as determined by the human operator), the human operator can perform maintenance operations to remove the blockage. Such manual inspections often require the 3D printer to be brought offline (i.e., stopping the current printing task). Therefore, frequent manual inspections can reduce the throughput of the printer system. Moreover, the human inspector often relies on his experience to determine the level of blockage (e.g., lightly blocked or severely blocked) at the nozzle and such determination can vary from person to person. There lacks a standard quantified criterion regarding the maintenance of the nozzle of 3D printers.

In some embodiments, an automated solution can be implemented in the printer system such that the blockage at the nozzle can be monitored automatically (e.g., by a machine) online (i.e., while the printer is performing a printing task). For example, the printer system can include one or more cameras that record live images (e.g., still images or videos) of the orifice of the printer nozzle during a jetting process. By analyzing the images (e.g., by using various image-processing techniques), a nozzle-monitoring module can distinguish, within the nozzle orifice, the blocked region from the unblocked region. More specifically, the nozzle-monitoring module can compute a nozzle blockage fraction (e.g., the percentage of the nozzle orifice being blocked) and determine, based on the nozzle blockage fraction, whether maintenance of the printer is needed.

FIG. 1 presents an exemplary printer system, according to one embodiment. In the example shown in FIG. 1, a printer system 100 can include a printer 102, a camera 104, an image-analysis module 106, and an optional illuminating module 108. FIG. 1 also demonstrates a to-be-printed part 110. Printer 102 can be a 3D LM printer that jets out droplets of LM from its nozzle. Other types of printer that may experience nozzle blockage can also be included. Camera 104 can be any type of camera capable of capturing still images or videos. In the case where camera 104 captures still images, camera 104 can be configured to have a relatively high shutter speed such that it can capture images at a high speed. This can be important because, while camera 104 is capturing images of the printer nozzle, the printer nozzle is jetting, through its orifice, droplets of LM at a high speed. To prevent blurring of the images, it is preferable that camera 104 be a high-speed camera. Similarly, if camera 104 is configured to capture videos, the frame rate of camera 104 needs to be relatively high such that each extracted frame can be a clear image of the orifice of the nozzle.

Image-analysis module 106 can be responsible for analyzing images (e.g., still images, video clips, frames extracted from a video clip, etc.) captured by camera 104. Such images typically can include images of the printer nozzle orifice. More specifically, analyzing those images can include distinguishing, in an image of the nozzle orifice, a portion of the nozzle orifice that is occluded by oxidized metal from the other portions that are not occluded. One approach relies on the difference in the reflective property between the oxidized and un-oxidized metal. Because the oxidized LM can typically have a random surface microtexture when it is deposited at the nozzle orifice, it can be less specular compared to un-oxidized LM. Therefore, by identifying regions having different reflective properties within the nozzle orifice, one can identify oxidized LM regions (i.e., regions occluded by the oxidized LM) and un-oxidized LM regions (i.e., regions that are jetting out LM droplets and, hence, are not occluded).

From the point of view of image analysis or feature analysis, the reflectivity can be measured by local texture (i.e., variations in pixel values). A rough local texture can indicate occlusion; whereas a smooth local texture can indicate absence of occlusion. In some embodiments, while analyzing an image, image-analysis module 106 can compute a measure of image texture across the nozzle orifice in a captured image in order to identify occluded and non-occluded regions within the nozzle orifice. The measure of image texture can be quantified as numerical values. In a further embodiment, image-analysis module 106 can apply a threshold on the quantified image texture measure. Regions having an image texture measure above a predetermined threshold can be marked as being occluded, whereas regions having an image texture measure below the predetermined threshold can be marked as being un-occluded. The system can further compute an occlusion fraction, defined as the percentage of the occluded area over the entire nozzle orifice. If the occlusion fraction is above a predetermined threshold, the system can determine that maintenance of the printer is needed, where the printer can be brought offline and the nozzle cleaned to remove the occlusion. Various physical or chemical occlusion removal operations can be performed.

In some embodiments, computing the image texture measure for an image can include computing a gray-level co-occurrence matrix (GLCM) of the image. The GLCM, also known as the gray-level co-occurence matrix, is a statistical method for examining the texture of an image by considering the spatial relationship of pixels. More specifically, GLCM can be used to characterize the texture of an image by indicating how often pairs of pixels with specific values and in a specified spatial relationship occur in an image. For example, a GLCM can be calculated based on how often a pixel with gray-level (grayscale intensity or tone) value i occurs either horizontally, vertically, or diagonally (as defined by an offset) to adjacent pixels with the value j. Due to the complexity of typical images, a single GLCM might not be enough to describe the textural features of an image. For example, a single horizontal offset might not be sensitive to texture with a vertical orientation. To capture the textural features in all directions, an offset matrix can be generated to describe the spatial relationship among the image pixels, and the GLCM for the input image can be computed based on the offset matrix. In some embodiments, the offset matrix can include a 2×4 matrix. In a further embodiment, the offset matrix can have the format: [0,1; −1,1; −1,0; −1, −1].

Once the GLCM is computed for an input image, a GLCM image map (where each pixel location in the image is assigned with certain GLCM features) can be generated for the input image based on the GLCM features. More specifically, an area in the image having a smooth texture can have different GLCM features compared to an area having a rough texture. For example, regions with smooth texture tend to have a higher GLCM correlation than regions with a rough texture.

In some embodiments, image-analysis module 106 can apply an appropriate threshold over the GLCM image map in order to mark areas in the image that are occluded (having a rough texture) and areas that are not occluded (having a smooth texture). In further embodiment, the GLCM image map can be thresholded using the Ostu thresholding mechanism and binarized to obtain a binary image map. More specifically, a pixel location having a GLCM value above the threshold can be given a value "1," whereas a pixel location having a GLCM value below the threshold can be given a value "0." The final binary image map can then be plotted, indicating areas of occlusion (pixels with a value "0") and areas of non-occlusion (pixels with a value "1").

Figure 2:
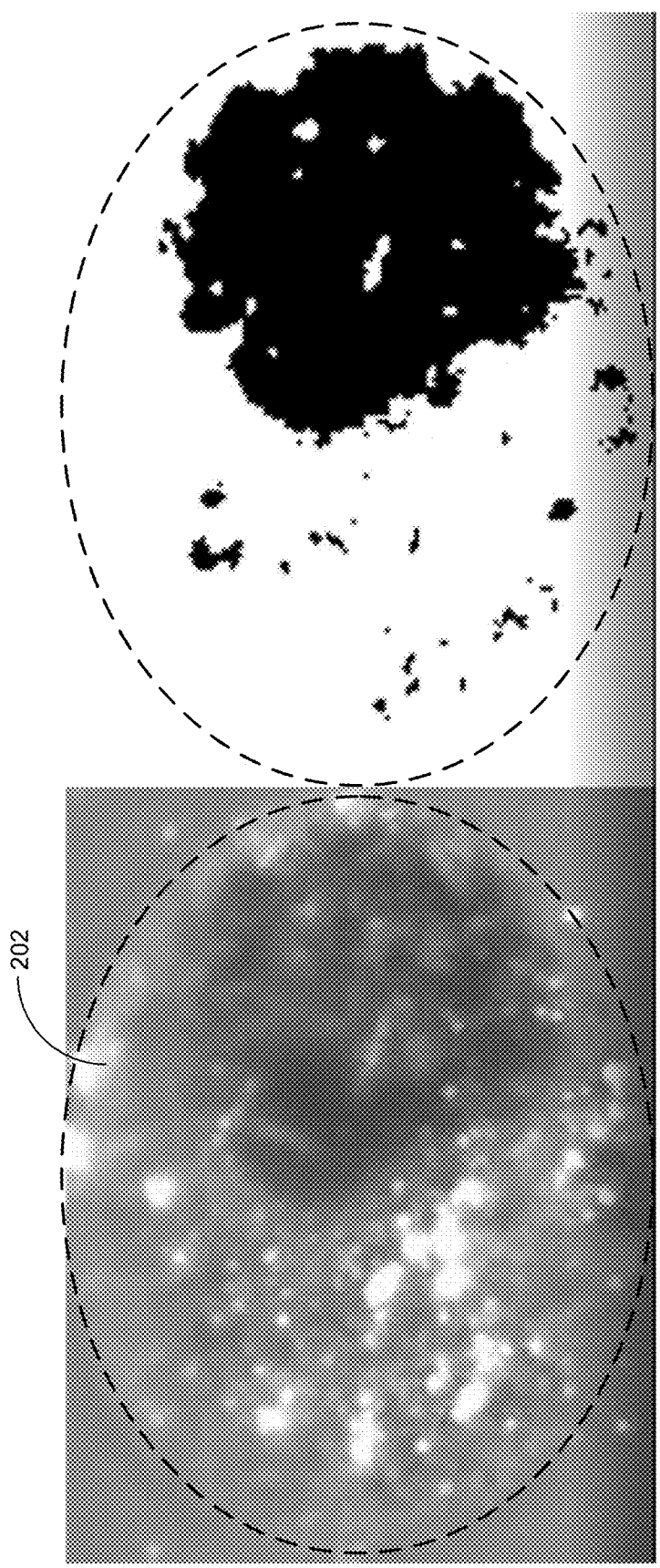
FIG. 2 illustrates an exemplary image-analysis result, according to one embodiment.

FIG. 2 illustrates an exemplary image-analysis result, according to one embodiment. The left drawing of FIG. 2 shows a raw image of the printer nozzle. The image can be a frame extracted from video clip of the printer nozzle while the nozzle is jetting LM droplets. Alternatively, this image can be a still image captured by a high-speed camera. From the left drawing, one can see that the lower right portion of nozzle 202 appear to be darker and less reflective, indicating that it is blocked by the oxide. On the other hand, the left and center portions of nozzle 202 appear to be more reflective, indicating that nozzle 202 is not blocked in those areas. Note that occlusion usually starts from the periphery of the nozzle orifice and gradually accumulates toward the center. Although it is possible for a human operator to visually distinguish the difference between the occluded and non-occluded regions from the image, it is hard to obtain a quantified measurement of the occluded area. Without such a quantified measurement, it is difficult to have an efficient maintenance schedule. Overly performed maintenance may decrease the throughput of the printer; whereas underperformed maintenance can compromise the uniformity of the deposited material, leading to imperfection in the printed product.

However, by implementing the image-analysis technique as discussed previously, embodiments of the present invention can provide a quantified measurement of the occluded area, making it possible to have an efficient and consistent maintenance arrangement. The right drawing of FIG. 2 illustrates how to quantify the occluded area of the orifice of nozzle 202. More specifically, the right drawing of FIG. 2 shows the binary image map of the nozzle orifice, with "white pixels" representing non-occluded regions and "black pixels" representing occluded regions. Note that the boundary of nozzle 202 can be marked using a dashed line. Such a boundary can be detected by the system using a standard feature-extraction technique. Alternatively, the system can determine the boundary of nozzle 202 based on the relative positions between the camera and nozzle 202, which are known information.

Based on the binary image map, the system can compute an occlusion fraction, which can be a ratio between the area of the occluded region and the total area of the orifice of the nozzle or a ratio between the occluded region and the non-occluded region. In some embodiments, the occlusion fraction can be computed by computing a ratio between the number of "black pixels" and a total number of pixels within the boundary of the orifice of the nozzle, or by computing a ratio between the number of "black pixels" and the number of "white pixels." The system can further compare the occlusion fraction with a predetermined threshold. If the occlusion fraction is above the predetermined threshold (referred to as the "maintenance threshold"), the system can determine that maintenance is needed. If the occlusion fraction is defined as the ratio between the area of the occluded region and the total area of the nozzle orifice, the threshold for the occlusion fraction can be between 10% and 50%, depending on the quality requirement of the printed product. A stricter quality requirement corresponds to a lower maintenance threshold of the occlusion fraction, whereas a more relaxed quality requirement corresponds to a higher maintenance threshold. This also means that a stricter quality requirement can result in more frequent maintenance, whereas a more relaxed quality requirement can result in less frequent maintenance.

Figure 3:
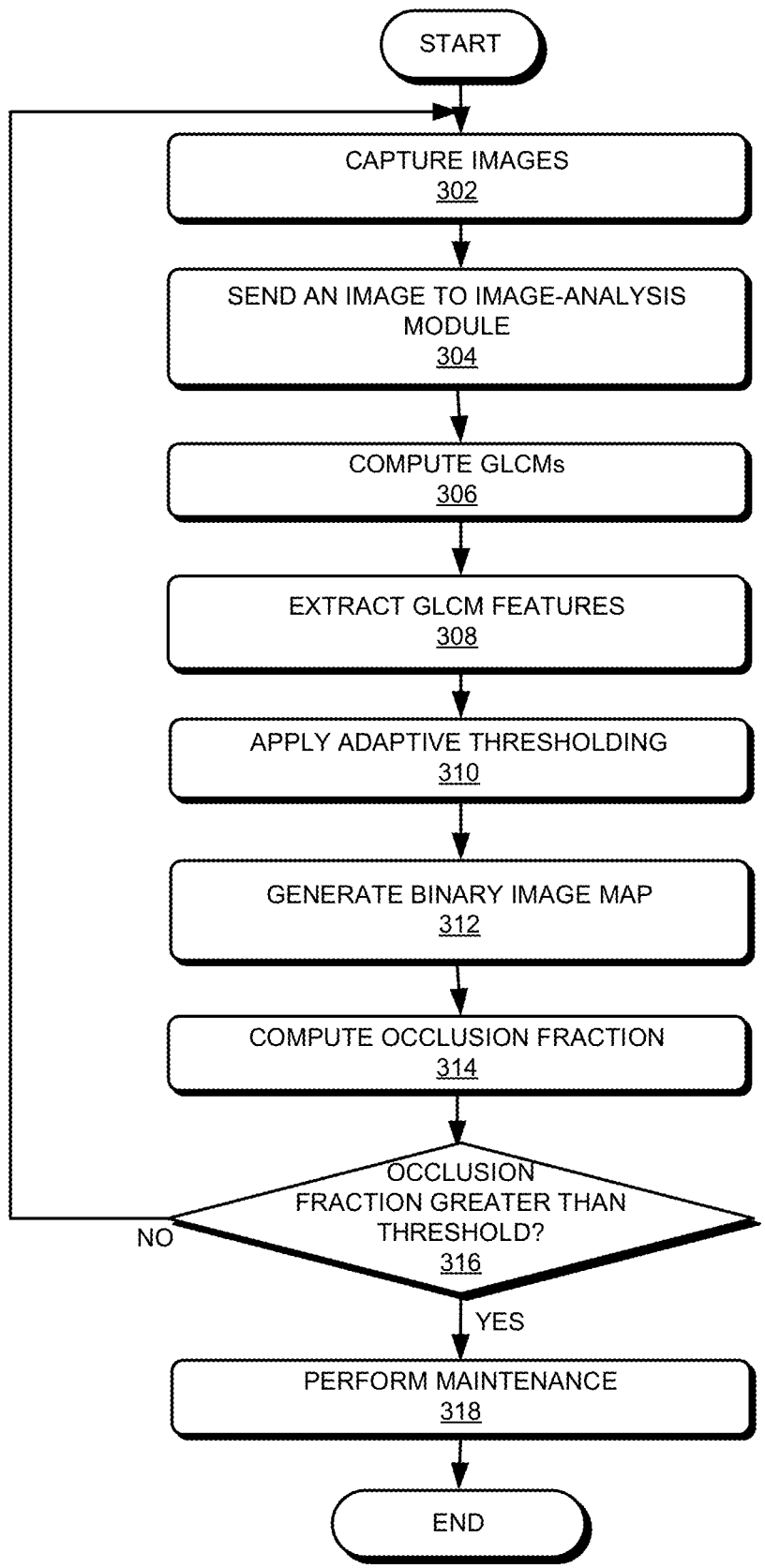
FIG. 3 presents a flowchart illustrating an exemplary process for determining the occlusion status of a printer nozzle, according to one embodiment.

FIG. 3 presents a flowchart illustrating an exemplary process for determining the occlusion status of a printer nozzle, according to one embodiment. During operation, one or more cameras can capture images of the nozzle orifice while the nozzle is jetting droplets of to-be-printed material (operation 302). In some embodiments, multiple cameras can be used to capture images from different viewing angles. In alternative embodiments, a single camera is used as long as the camera has an unblocked view of the nozzle orifice at all times. The images can include still images or videos. Appropriate illumination may be used to ensure that the occlusion is clearly detected at the nozzle A captured image can be sent to an image-analysis module (operation 304). In some embodiments, the image-analysis module can compute one or more GLCMs for the image (operation 306). In further embodiments, computing the GLCMs can include generating an offset matrix (e.g., a 2×4 matrix) and applying the offset matrix on the image. One can choose an offset matrix that can provide a good measurement of the texture. In one embodiment, the offset matrix can be [0,1; −1,1; −1,0; −1, −1]. One GLCM can be computed for a window comprising a small portion of the image. The window size also needs to be chosen carefully so that local variations in texture can be captured without excessive consumption of computation power. Too big a window may cause loss of finer textures, whereas too small a window can require a huge amount of computation resources. Various GLCM features can be extracted from the GLCMs (operation 308), such as the energy (or uniformity), entropy (which is a measure of randomness), contrast, etc. Adaptive thresholding (e.g., Otsu thresholding) techniques can be applied on the extracted GLCM features (e.g., the energy) of the image pixels (operation 310) and a binary image map can be generated based on the outcome of the thresholding operation (operation 312). The system can then compute the occlusion fraction (which can be defined as a ratio between the occluded region and the non-occluded region or a ration between the occluded region and the total area of the nozzle orifice) based on the binary image map (operation 314) and determine whether the occlusion fraction is greater than a predetermined threshold (operation 316). If so, the system interrupts printing to perform maintenance on the nozzle (operation 318). If not, the system continues to capture images of the printer nozzle orifice (operation 302). In some embodiments, the system may operate in an interval mode where images can be captured and analyzed intermittently. For example, subsequent to capturing and analyzing an image, the system can wait, for a predetermined interval (e.g., a few seconds or a few minutes), to capture and analyze a new image of the nozzle orifice. This saves computation power but allows periodic monitoring of the nozzle orifice. Alternatively, the system can capture a continuous video of the nozzle orifice but can periodically extract still frames for analysis. In some embodiments, the system may operate in a continuous mode where images can be captured and analyzed continuously. The continuous monitoring of the nozzle orifice can provide the most up-to-date occlusion status of the nozzle orifice but can consume a large amount of computing power.

Other image-analysis techniques can also be used to distinguish between occluded regions and the non-occluded regions in images of the nozzle orifice. In some embodiments, a machine-learning technique can be used for analyzing images of the nozzle orifice. More specifically, one can train a neural network (e.g., a convolutional neural network (CNN)) to recognize, from an image of a nozzle orifice, occluded and non-occluded regions. For example, one can use a set of training images (also known as the ground truth) to train the CNN. The training images can include images of partially occluded nozzle orifices, with pre-annotated occluded and non-occluded regions. In one embodiment, the training images can be obtained manually. For example, human operators can manually draw the boundary between the occluded and non-occluded regions. In alternative embodiments, the training images can be obtained automatically using the previously mentioned image-analysis technique, where a binary image map is generated based on computed GLCMs of the image. The binary image map (as shown by the right drawing of FIG. 2) can then be used to label the image of the nozzle orifice (e.g., by marking the boundary between the occluded and non-occluded regions or by highlighting occluded regions).

Once sufficiently trained, the neural network can accept raw images (e.g., images captured by a camera) of the nozzle orifice and can recognize occluded and non-occluded regions in the image, putting out a binary segmentation map delineating occluded from non-occluded regions. The occlusion fraction can be calculated using previously discussed methods.

Figure 4:
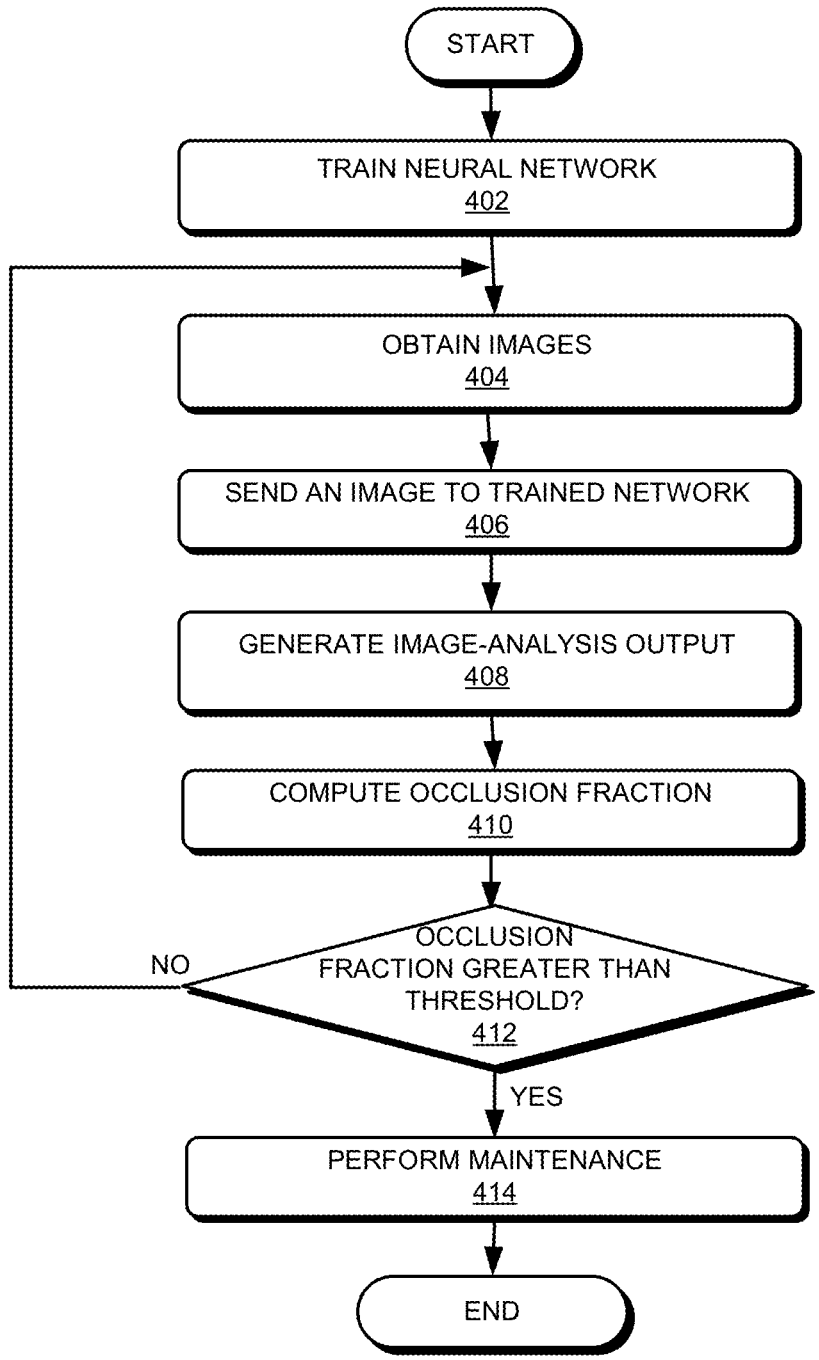
FIG. 4 presents a flowchart illustrating an exemplary process for determining the occlusion status of a printer nozzle, according to one embodiment.

FIG. 4 presents a flowchart illustrating an exemplary process for determining the occlusion status of a printer nozzle, according to one embodiment. The operation starts with training a neural network (operation 402). More specifically, training the neural network can include providing a set of labeled images of partially occluded nozzle orifices. The images can be labeled manually or automatically (e.g., by using an image-analysis technique that can recognize the difference in texture between the occluded and non-occluded regions). In some embodiments, the depth of the neural network can be between 10 and 20. The trained neural network can be later used for analyzing, either online of offline, images of the nozzle orifice. Subsequent to the training, the system can obtain one or more images of the nozzle orifice (operation 404). In some embodiments, obtaining the images can involve using one or more cameras to capture the images of the nozzle orifice when the nozzle is jetting droplets of to-be-printed material (e.g., droplets of LM). One image can be sent to the trained neural network (operation 406). The trained neural network can generate an image-analysis output based on the received image (operation 408). More specifically, the trained neural network can distinguish between occluded and non-occluded regions within the nozzle orifice. In some embodiments, the image-analysis output can include a pixel map that maps all pixels in the image to one of two levels indicating respectively presence and absence of occlusion within the nozzle orifice. The system can further compute an occlusion fraction (operation 410). As discussed previously, the occlusion fraction can be computed based on the number of pixels in the occluded region and the number of pixels in the non-occluded region in the image of the nozzle orifice. The system can further determine whether the occlusion fraction is greater than a predetermined threshold (operation 412). If so, the system interrupts the printing operation to service the printer (operation 414). Otherwise, additional images can be obtained (operation 404).

Alternatively, training the neural network can involve inputting a sequence of images of the nozzle orifice that are captured over a predetermined time period. More specifically, the neural network can be trained to distinguish occluded and non-occluded regions based on their differences in spatial-temporal characteristics. As discussed previously, an occluded region is spatially textured, whereas a non-occluded region is spatially smooth. Moreover, due to the fact that occlusion accumulates during printing, the already occluded region tends to remain consistent in appearance over time (i.e., exhibiting less temporal variation), whereas the non-occluded region may exhibit greater variation over time due to droplets ejection (i.e., exhibiting more temporal variation). Hence, it is possible to train the neural network to observe the spatio-temporal variation of the nozzle orifice based on a sequence of images captured over a time interval. For example, the system can consecutively capture 10 images of the nozzle orifice within a time interval (e.g., 10 seconds or 30 seconds). The system can choose one image as the base image. The base image can be the first image, the last image, or any image in between. A binary pixel map can be generated for the base image, either by manual labeling or using the image-analysis technique described previously. Such a binary pixel map will be the ground truth used for training the neural network. When the 10 images are compared to one another, using the binary pixel map of the base image as a reference, one can see that the occluded regions in these images remain substantially unchanged and the non-occluded regions in these images may change from image to image (i.e., vary over time). Therefore, one can train a neural network using sets of images captured over time and their corresponding ground truth images (i.e., binary pixel maps).

The trained neural network can then be used to recognize occluded and non-occluded regions in an image of the nozzle orifice. In some embodiments, the system can input a set of consecutively captured images to the trained neural network and select one image from the set of images as the base image. In some embodiments, the time-based order of the images can be maintained when the images are inputted to the neural network (e.g., the images can be inputted sequentially or the images can be labeled based on their order in time. The trained neural network can then generate an output based on the image sequence and the base image. More specifically, the output can include a binary pixel map of the base image or a labeled image of the nozzle orifice with occluded regions marked. To ensure that the most up-to-date occlusion status can be detected by the system, in some embodiments, the base image can be the newest or last image in the sequence of images.

In addition to image sequences, the neural network can also be trained to recognize the occlusion status of a nozzle orifice from a video of the nozzle orifice. Similarly, the neural network can generate an output based on the video. The output can include a binary pixel map of the last frame in the video or a binary map for each input frame.

Figure 5:
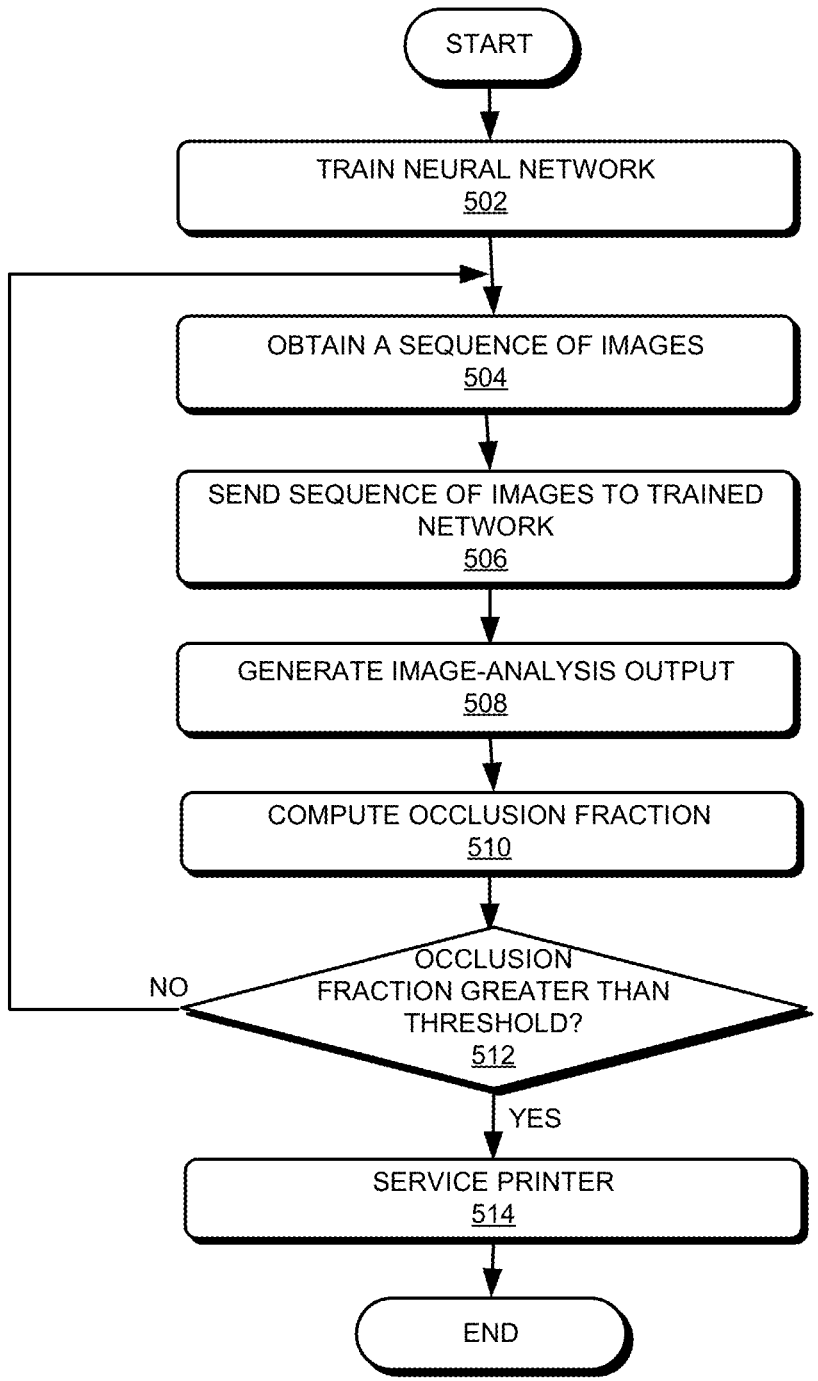
FIG. 5 presents a flowchart illustrating an exemplary process for determining the occlusion status of a printer nozzle, according to one embodiment.

FIG. 5 presents a flowchart illustrating an exemplary process for determining the occlusion status of a printer nozzle, according to one embodiment. The operation starts with training a neural network (operation 502). More specifically, training the neural network can include providing a plurality of sets of consecutively captured images of partially occluded nozzle orifices along with ground truth images for each set of images. The ground truth images can be generated manually or automatically. Subsequent to the training, the system can obtain a sequence of images or a video of the nozzle orifice captured over a predetermined time interval (operation 504). The images or video are captured while the nozzle is jetting. The time interval can be between a few seconds and a few minutes. The sequence of images or video can be sent to the trained neural network (operation 506). Note that the images can be sent in order or out of order. The trained neural network can generate an image-analysis output based on the received images (operation 508). More specifically, the image-analysis output can include a binary pixel map or a labeled image of the nozzle orifice. The system can further compute an occlusion fraction (operation 510) and determine whether the occlusion fraction is greater than a predetermined threshold (operation 512). If so, the system interrupts the printing operation to service the printer (operation 514). Otherwise, additional images can be obtained (operation 504).

Figure 6:
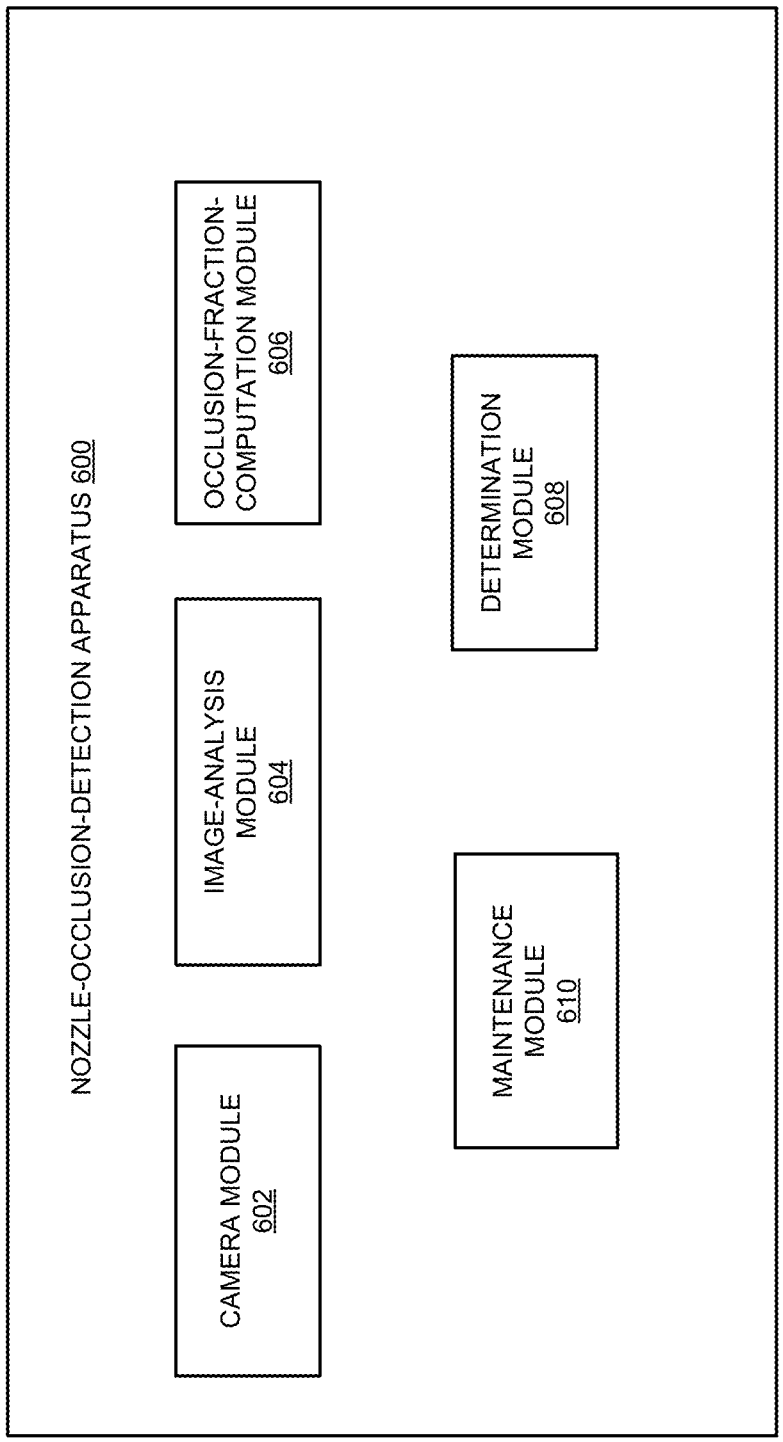
FIG. 6 illustrates an exemplary nozzle-occlusion-detection apparatus, according to one embodiment.

FIG. 6 illustrates an exemplary nozzle-occlusion-detection apparatus, according to one embodiment. Nozzle-occlusion-detection apparatus 600 can include a camera module 602, an image-analysis module 604, an occlusion-fraction-computation module 606, a determination module 608, and a maintenance module 610.

Camera 602 can be responsible for capturing images (e.g., still images or videos) of the nozzle orifice while the printer nozzle is jetting to-be-printed material (e.g., LM droplets). Image-analysis module 604 can be responsible for analyzing one or more captured images. In some embodiments, image-analysis module 604 can extract GLCM features from an image in order to perform texture analysis on the image. In such scenarios, image-analysis module 604 can further use an adaptive thresholding technique (e.g., Otsu thresholding) to generate a binary pixel map of the image. In alternative embodiments, image-analysis module 604 can use a machine-learning technique. For example, a trained neural network can generate a binary pixel map of a raw image of the nozzle orifice.

Occlusion-fraction-computation module 606 can be responsible for computing an occlusion fraction. The occlusion fraction can be a ratio between pixels in the occluded region (pixel_occ) and pixels in the non-occluded region (pixel_non_occ), that is $Occ_f = pixel_{occ}/pixel_{non\_occ}$. Alternatively, the occlusion fraction can be a ratio between pixels in the occluded region and pixels in the entire nozzle orifice. In certain scenarios, the binary pixel map may not distinguish between the non-occluded nozzle orifice and the background (e.g., as shown in FIG. 2B), because the background may happen to have a similar smooth texture. In such a scenario, the system can use a calibration technique to compute the number pixels in the image that are within the nozzle orifice. Such a calibration can be performed based on the camera angle, distance, the actual size of the nozzle orifice, the size of the image, and the size of the pixels.

Determination module 608 can be responsible for determining whether the occlusion fraction is greater than a predetermined threshold. In some embodiments, the occlusion fraction is calculated as a ratio between the occluded area and the total area of the nozzle orifice and the predetermined threshold can be 50%. The output of determination module 608 can be sent to a maintenance module 610. More specifically, when determination module 608 determines that the occlusion fraction is above a predetermined threshold, maintenance module 610 can be triggered to facilitate maintenance of the 3D printer. In some embodiments, maintenance module 610 can bring the 3D printer offline and send notifications to equipment operators to allow the equipment operator to perform the corresponding maintenance operation (e.g., cleaning the nozzle orifice).

Exemplary Computer System

Figure 7:
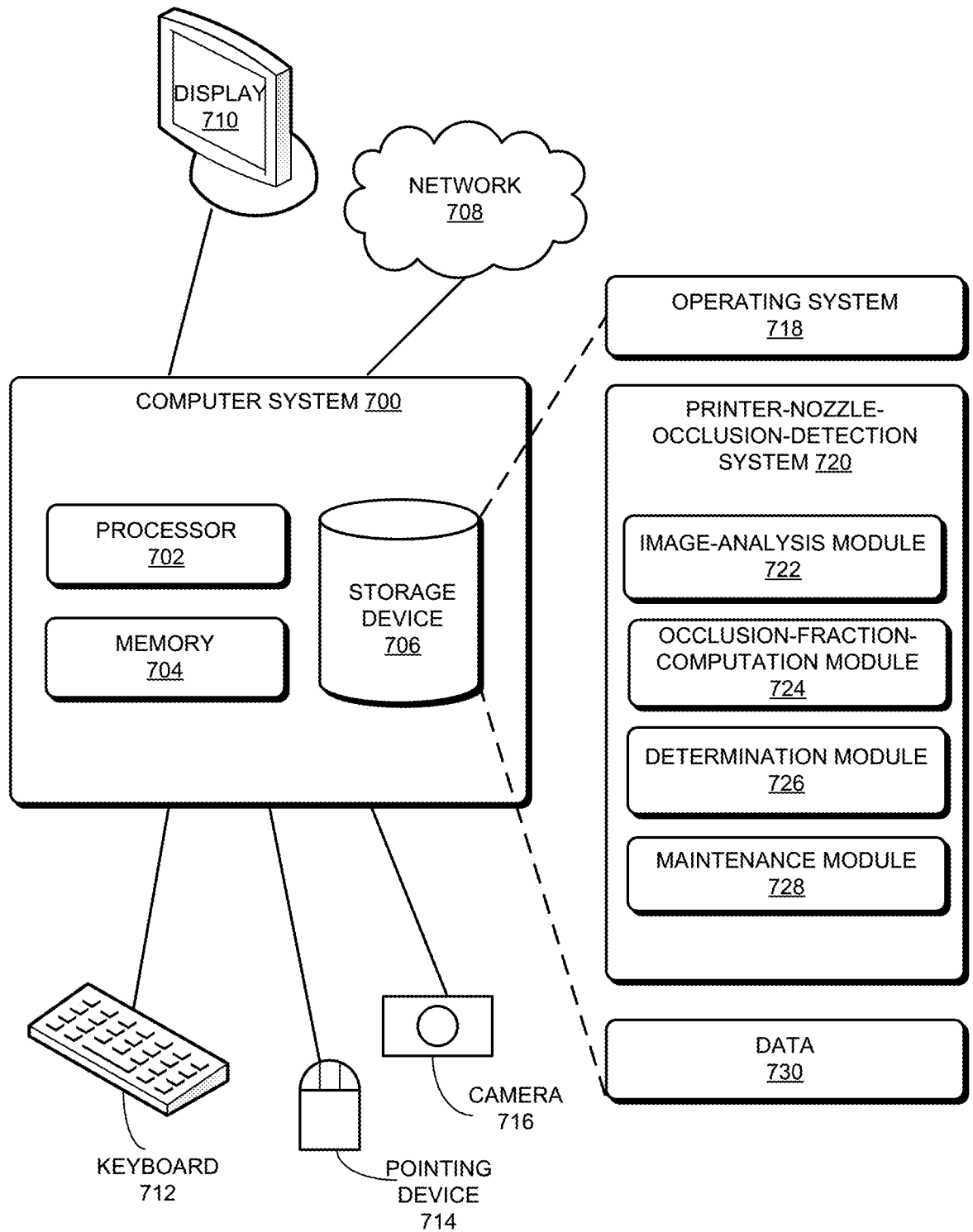
FIG. 7 illustrates an exemplary computer system that facilitates a printer-nozzle-occlusion-detection system, according to one embodiment.

FIG. 7 illustrates an exemplary computer system that facilitates a printer-nozzle-occlusion-detection system, according to one embodiment. Computer system 700 includes a processor 702, a memory 704, and a storage device 706. Computer system 700 can be coupled to a display device 710, a keyboard 712, a pointing device 714, a camera 716, and can also be coupled via one or more network interfaces to network 708. Storage device 706 can store an operating system 718, a printer-nozzle-occlusion-detection system 720, and data 730.

Printer-nozzle-occlusion-detection system 720 can include instructions, which when executed by computer system 700 can cause computer system 700 to perform methods and/or processes described in this disclosure. Printer-nozzle-occlusion-detection system 720 can include instructions for analyzing images of the printer nozzle orifice captured by camera 716 (image-analysis module 722), instructions for computing an occlusion fraction based on the image-analysis outcome (occlusion-fraction-computation module 724), instructions for determining whether the occlusion fraction exceeds a predetermined threshold (determination module 726), and instructions for facilitating maintenance of the printer (maintenance module 728).

In general, embodiments of the present invention provide a solution for automated online detection of the occlusion status of the nozzle of a 3D printer. Instead of manual inspection, the disclosed embodiments analyze images of the printer nozzle orifice, the images being captured when the printer nozzle is jetting. Various image-analysis techniques, including a GLCM-based image-texture analysis technique and a machine-learning technique, can be used to generate a binary pixel map indicating occluded regions within the nozzle orifice. Such a binary pixel map enables the computation of an occlusion fraction, which is a quantified measure of the occlusion status of the nozzle orifice. The computation of the occlusion fraction allows for a substantially effective and consistent maintenance practice. For example, maintenance of the nozzle can be performed when the occlusion fraction exceeds a predetermined threshold.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules or apparatus. The hardware modules or apparatus can include, but are not limited to, application-specific integrated circuit (ASIC) chips, field-programmable gate arrays (FPGAs), dedicated or shared processors that execute a particular software module or a piece of code at a particular time, and other programmable-logic devices now known or later developed.

When the hardware modules or apparatus are activated, they perform the methods and processes included within them.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-executed method for determining a maintenance schedule for a three-dimensional (3D) printer nozzle, the method comprising:
obtaining an image of an orifice of the 3D printer nozzle captured by a camera while the 3D printer nozzle is jetting liquid droplets;
performing, by a computer, an image-analysis operation on the captured image to determine an occlusion fraction of the orifice of the 3D printer nozzle; and
determining the maintenance schedule for the 3D printer nozzle based on the occlusion fraction and a predetermined occlusion threshold.

2. The computer-executed method of claim 1, further comprising adjusting the predetermined occlusion threshold based a quality requirement associated with printed products of the 3D printer.

3. The computer-executed method of claim 1, further comprising:
obtaining a sequence of images of the orifice captured over a time period; and
performing, by the computer, the image-analysis operation on the sequence of images to determine time-varying changes of one or more occluded regions within the orifice.

4. The computer-executed method of claim 1, wherein performing the image-analysis operation on the captured image comprises computing a gray-level co-occurrence matrix (GLCM) for the captured image to obtain a texture-analysis outcome associated with the captured image.

5. The computer-executed method of claim 4, wherein performing the image-analysis operation further comprises:
applying an adaptive thresholding technique on the texture-analysis outcome to obtain a binary pixel map of the captured image.

6. The computer-executed method of claim 1, wherein performing the image-analysis operation on the captured image comprises applying a machine-learning technique to identify one or more occluded regions within the orifice.

7. The computer-executed method of claim 1, further comprising performing maintenance on the 3D printer nozzle in response to the occlusion fraction exceeding the predetermined occlusion threshold.

8. A non-transitory computer-readable storage medium storing instructions that when executed by a computer cause the computer to perform a method for determining a maintenance schedule for a three-dimensional (3D) printer nozzle, the method comprising:
obtaining an image of an orifice of the 3D printer nozzle captured by a camera while the 3D printer nozzle is jetting liquid droplets;
performing an image-analysis operation on the captured image to determine an occlusion fraction of the orifice of the 3D printer nozzle; and
determining the maintenance schedule for the 3D printer nozzle based on the occlusion fraction and a predetermined occlusion threshold.

9. The non-transitory computer-readable storage medium of claim 8, wherein the method further comprises adjusting the predetermined occlusion threshold based a quality requirement associated with printed products of the 3D printer.

10. The non-transitory computer-readable storage medium of claim 8, wherein the method further comprises:
obtaining a sequence of images of the orifice over a time period;
performing the image-analysis operation on the sequence of images to determine time-varying changes of one or more occluded regions within the orifice.

11. The non-transitory computer-readable storage medium of claim 8, wherein performing the image-analysis operation on the captured image comprises computing a gray-level co-occurrence matrix (GLCM) for the captured image to obtain a texture-analysis outcome associated with the captured image.

12. The non-transitory computer-readable storage medium of claim 11, wherein performing the image-analysis operation further comprises applying an adaptive thresholding technique on the texture-analysis outcome to obtain a binary pixel map of the captured image.

13. The non-transitory computer-readable storage medium of claim 8, wherein performing the image-analysis operation on the captured image comprises applying a machine-learning technique to identify one or more occluded regions within the orifice.

14. The non-transitory computer-readable storage medium of claim 8, wherein the method further comprises performing maintenance on the 3D printer nozzle in response to the occlusion fraction exceeding the predetermined occlusion threshold.

15. A three-dimensional (3D) printer system, comprising:
a printer nozzle;
a processor; and
a storage device coupled to the processor and storing instructions which when executed by the processor cause the processor to perform a method, the method comprising:
obtaining an image of an orifice of the printer nozzle captured by a camera while the printer nozzle is jetting liquid droplets;
performing an image-analysis operation on the captured image to determine an occlusion fraction of the orifice of the printer nozzle; and
determining a maintenance schedule for the printer nozzle based on the occlusion fraction and a predetermined occlusion threshold.

16. The 3D printer system of claim 15, wherein the method further comprises adjusting the predetermined occlusion threshold based a quality requirement associated with printed products of the 3D printer.

17. The 3D printer system of claim 15, wherein the method further comprises:
obtaining a sequence of images of the orifice over a time period;
performing the image-analysis operation on the sequence of images to determine time-varying changes of one or more occluded regions within the orifice.

18. The 3D printer system of claim 15, wherein performing the image-analysis operation on the captured image comprises computing a gray-level co-occurrence matrix (GLCM) for the captured image to obtain a texture-analysis outcome associated with the captured image.

19. The 3D printer system of claim 18, wherein performing the image-analysis operation further comprises applying an adaptive thresholding technique on the texture-analysis outcome to obtain a binary pixel map of the captured image.

20. The 3D printer system of claim 15, wherein performing the image-analysis operation on the captured image comprises applying a machine-learning technique to identify one or more occluded regions within the orifice.

* * * * *